United States Patent
Harris (10) Patent No.: US 10,478,841 B2
(45) Date of Patent: Nov. 19, 2019

(54) MODULAR SPRAYER SYSTEM FOR HEAVY-LIFT UNMANNED AERIAL VEHICLES

(71) Applicant: Benjamin Harris, Casselberry, FL (US)

(72) Inventor: Benjamin Harris, Casselberry, FL (US)

(73) Assignee: Harris Aerial LLC, Casselberry, FL (US)

( * ) Notice: Subject to any disclaimer, the term of this patent is extended or adjusted under 35 U.S.C. 154(b) by 101 days.

(21) Appl. No.: 15/819,756

(22) Filed: Nov. 21, 2017

(65) Prior Publication Data

US 2018/0093284 A1   Apr. 5, 2018

Related U.S. Application Data

(63) Continuation-in-part of application No. 15/265,948, filed on Sep. 15, 2016, now Pat. No. 10,266,245.

(Continued)

(51) Int. Cl.

| | | |
|---|---|---|
| *B05B 9/00* | (2006.01) | |
| *H04N 7/18* | (2006.01) | |
| *B05B 12/08* | (2006.01) | |
| *A01C 23/04* | (2006.01) | |
| *B64D 1/18* | (2006.01) | |

(Continued)

(52) U.S. Cl.
CPC ............ *B05B 9/007* (2013.01); *A01C 23/047* (2013.01); *A01M 7/0089* (2013.01); *B05B 9/0403* (2013.01); *B05B 9/0426* (2013.01); *B05B 12/081* (2013.01); *B05B 12/12* (2013.01); *B64C 1/061* (2013.01); *B64C 25/52* (2013.01); *B64D 1/18* (2013.01); *G01S 17/88* (2013.01); *H04N 7/185* (2013.01); *A01C 23/007* (2013.01); *A01C 23/008* (2013.01); *B05B 1/16* (2013.01); *B05B 15/65* (2018.02); *B64C 39/024* (2013.01); *B64C 2201/027* (2013.01); *B64C 2201/108* (2013.01); *B64C 2201/12* (2013.01); *B64C 2201/146* (2013.01); *G01S 17/02* (2013.01)

(58) Field of Classification Search
CPC ..... B05B 9/007; B05B 9/0403; B05B 9/0426; B05B 12/081; B05B 12/12; B64C 39/024; B64C 1/061; B64C 25/52; B64D 1/18
USPC .......................... 239/69, 171, 332, 390, 391
See application file for complete search history.

(56) References Cited

U.S. PATENT DOCUMENTS

| | | |
|---|---|---|
| 2012/0083945 A1 | 4/2012 | Oakley et al. |
| 2015/0259066 A1 | 9/2015 | Johannesson et al. |

(Continued)

*Primary Examiner* — Steven J Ganey
(74) *Attorney, Agent, or Firm* — Jason T Daniel, Esq.; Daniel Law Offices, P.A.

(57) ABSTRACT

A modular sprayer system for use with heavy-lift unmanned aerial vehicles includes a liquid storage tank for receiving and storing any type of agricultural products. A mounting unit is located along the top of the tank and includes hardware for securing the system to a UAV. Skid-type landing gear is permanently secured to the outside of the tank, and an electric pump is disposed within the tank. The location of the pump dampens movement of fluid within the tank during flight. One or more elongated booms are in fluid communication with the pump and terminate into dispensing units having one or more nozzles for releasing the fluid. A control unit is in electrical communication with one or both of the UAV to which the system is secured and a system operator. A tank level sensor and imaging systems are communicatively linked with the control unit.

11 Claims, 6 Drawing Sheets

Related U.S. Application Data (60) Provisional application No. 62/318,918, filed on Apr. 6, 2016.

(51) Int. Cl.
| | | |
|---|---|---|
| *B64C 25/52* | (2006.01) | |
| *B05B 9/04* | (2006.01) | |
| *B64C 1/06* | (2006.01) | |
| *G01S 17/88* | (2006.01) | |
| *B05B 12/12* | (2006.01) | |
| *A01M 7/00* | (2006.01) | |
| *A01C 23/00* | (2006.01) | |
| *B64C 39/02* | (2006.01) | |
| *G01S 17/02* | (2006.01) | |
| *B05B 15/65* | (2018.01) | |
| *B05B 1/16* | (2006.01) | |

(56) References Cited

U.S. PATENT DOCUMENTS

| | | | |
|---|---|---|---|
| 2015/0274294 A1* | 10/2015 | Dahlstrom | B64D 1/18 239/722 |
| 2015/0321755 A1 | 11/2015 | Martin et al. | |
| 2015/0321758 A1 | 11/2015 | Sarna, II | |
| 2016/0082460 A1* | 3/2016 | McMaster | B05B 9/007 239/171 |
| 2016/0122016 A1 | 5/2016 | Mintchev et al. | |
| 2016/0152316 A1 | 6/2016 | Wang et al. | |
| 2016/0167776 A1 | 6/2016 | Shaw | |
| 2016/0325834 A1 | 11/2016 | Foster | |
| 2016/0339789 A1 | 11/2016 | Wang et al. | |
| 2016/0376004 A1 | 12/2016 | Claridge et al. | |
| 2017/0085840 A1 | 3/2017 | Mizushina et al. | |
| 2017/0158328 A1 | 6/2017 | Foley | |
| 2017/0203843 A1 | 7/2017 | Chan et al. | |
| 2017/0210470 A1* | 7/2017 | Pardell | B08B 1/006 |
| 2017/0267334 A1 | 9/2017 | Tsai | |
| 2018/0002023 A1 | 1/2018 | Tian et al. | |
| 2018/0016027 A1 | 1/2018 | Cheatham, III et al. | |

* cited by examiner

MODULAR SPRAYER SYSTEM FOR HEAVY-LIFT UNMANNED AERIAL VEHICLES

CROSS-REFERENCE TO RELATED APPLICATIONS

This application claims the benefit of U.S. Application Ser. No. 62/318,918 filed on Apr. 6, 2016, and copending U.S. application Ser. No. 15/265,948, filed on Sep. 15, 2016, the contents of each of which are incorporated herein by reference.

TECHNICAL FIELD

The present invention relates generally to unmanned aerial vehicles, and more particularly to modular sprayer system for heavy-lift UAV's.

BACKGROUND

The statements in this section merely provide background information related to the present disclosure and may not constitute prior art.

Modern crop farms must periodically apply agricultural products such as pesticides and/or fertilizers to ensure proper nutrition and a satisfactory crop growth rate and production. Although there are many ways to apply such products, it is universally agreed that the most efficient way is to do so from an elevated position, a process known as crop dusting.

To this end, there are many agricultural aerial application services which utilize a manned aircraft that is specially equipped with a liquid storage tank and sprayer system. Although useful for spraying tens or hundreds of acres at once, the large airspace requirements and relatively high costs are not conducive to smaller farms having only a few acres.

An Unmanned Aerial Vehicle (UAV) is a heavier-than-air flying machine that does not carry a human operator. UAV's are remotely operated, and are utilized for many different military and civilian applications such as reconnaissance, surveillance, area mapping, and/or photography, for example.

Traditionally, the use and implementation of small vertical takeoff and landing UAV's was limited to hobbyists and/or photographic usage, owing to the lightweight construction and minimum engine/lifting capacity of the same. However, recent advancements in micro engine technology have seen the introduction of heavy-lift UAV's capable of lifting hundreds of pounds for sustained periods of time.

Accordingly, it would be beneficial to provide a modular sprayer system for heavy-lift unmanned aerial vehicles which can be utilized to perform agricultural aerial application services in instances where traditional methods are unsuitable or cost prohibitive.

SUMMARY OF THE INVENTION

The present invention is directed to a UAV mounted modular sprayer system. In one embodiment, the system can include a liquid storage tank for receiving and storing any type of agricultural products. The system can be mounted to the bottom of a UAV via a mounting unit that is located along the top of the tank. The mounting unit can include apertures and hardware that is complementary to the mounting hardware of any number of different UAV's.

In one embodiment, skid-type landing gear can be permanently secured to the outside of the tank, and an electric pump can be disposed within the tank. The pump can act as a baffle to dampen the movement of fluid within the tank during flight, and can dispense the fluid into any number of elongated booms. Each of the elongated booms can terminate into a dispensing unit having one or more nozzles for releasing the fluid.

In one embodiment, the system can include a control unit for communicating with one or both of the UAV to which the system is secured and a system operator independently. The control unit can control the operation of the pump. The system can also include a tank level sensor and imaging systems such as cameras or LIDAR sensors, for example. The information from the sensor/camera(s) can be transmitted to the user via the control unit.

This summary is provided merely to introduce certain concepts and not to identify key or essential features of the claimed subject matter.

BRIEF DESCRIPTION OF THE DRAWINGS

Presently preferred embodiments are shown in the drawings. It should be appreciated, however, that the invention is not limited to the precise arrangements and instrumentalities shown.

DETAILED DESCRIPTION OF THE INVENTION

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

Identical reference numerals are used for like elements of the invention or elements of like function. For the sake of clarity, only those reference numerals are shown in the individual figures which are necessary for the description of the respective figure. For purposes of this description, the terms "upper," "bottom," "right," "left," "front," "vertical," "horizontal," and derivatives thereof shall relate to the invention as oriented in FIG. 1.

As described herein, the term "removably secured," "removably engaged" and derivatives thereof shall be used to describe a situation wherein two or more objects are joined together in a non-permanent manner so as to allow the same objects to be repeatedly joined and separated. This can be accomplished through the use of any number of commercially available connectors such as opposing strips of hook and loop material (i.e. Velcro®), magnetic elements, and compression fittings such as nuts/bolts, quick connect fittings, hooks, snaps and buttons, for example.

Figure 6:
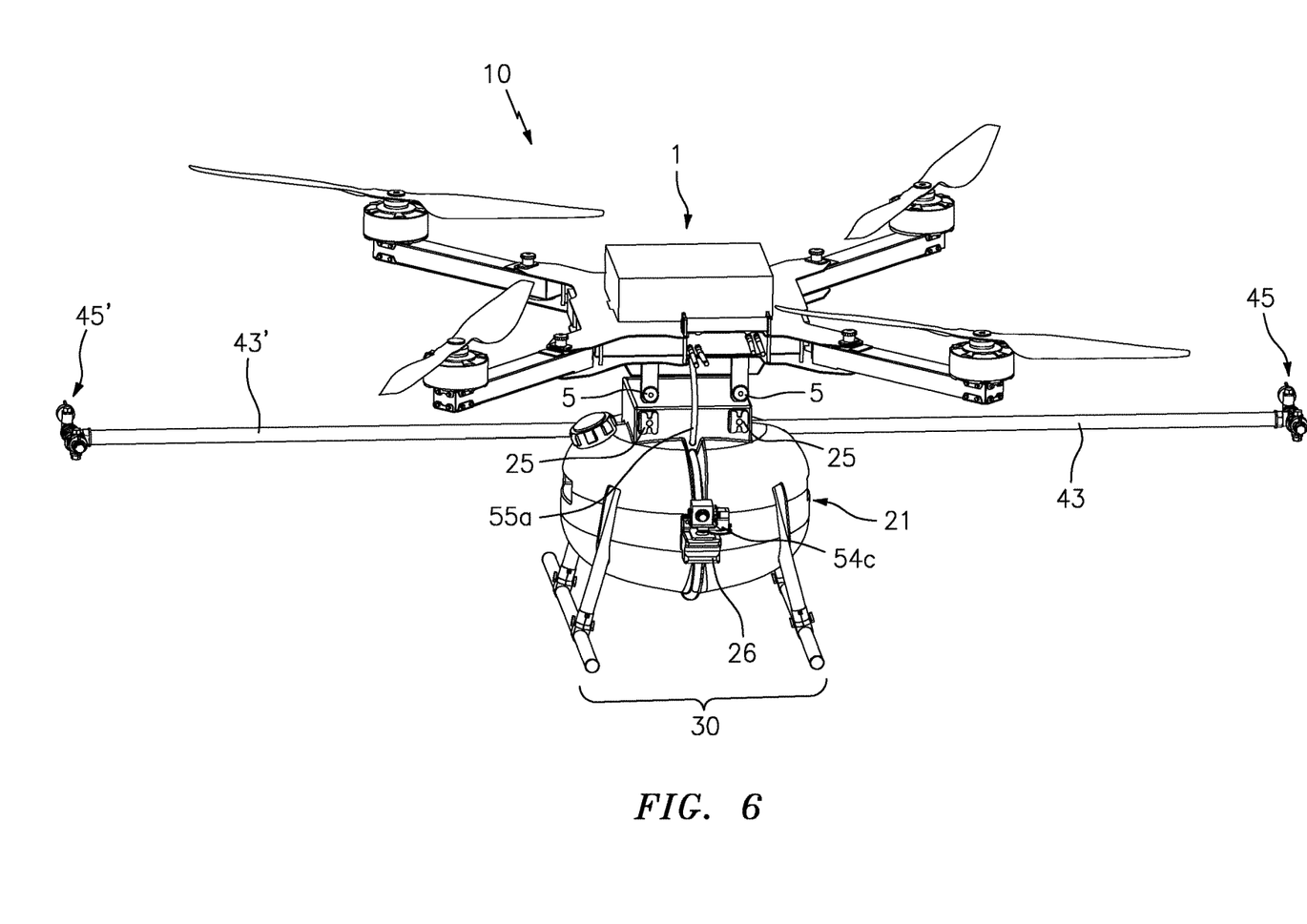
FIG. 6 is a perspective view of the UAV modular spraying system in operation, in accordance with one embodiment of the invention.

As described herein, the center of gravity of an aircraft such as the UAV 1 illustrated in FIG. 6, is the point at which the entire weight of a body may be considered as concentrated so that if supported at this point the body would remain in equilibrium in any position. Therefore, the term "in line with the center of gravity" is defined as being located along the same vertical plane as the center of gravity of the UAV when the system 10 is secured thereon.

Although described as storing and dispensing liquid agricultural products, this is but one possible intended use for the system. However, the system is not limited for use with agricultural products, as any type of liquid can be dispensed using the system.

FIGS. 1-6 illustrate one embodiment of a modular sprayer system for heavy-lift unmanned aerial vehicles 10 that are useful for understanding the inventive concepts disclosed herein. In each of the drawings, identical reference numerals are used for like elements of the invention or elements of like function. For the sake of clarity, only those reference numerals are shown in the individual figures which are necessary for the description of the respective figure. For purposes of this description, the terms "upper," "bottom," "right," "left," "front," "vertical," "horizontal," and derivatives thereof shall relate to the invention as oriented in FIG. 1.

Figure 1:
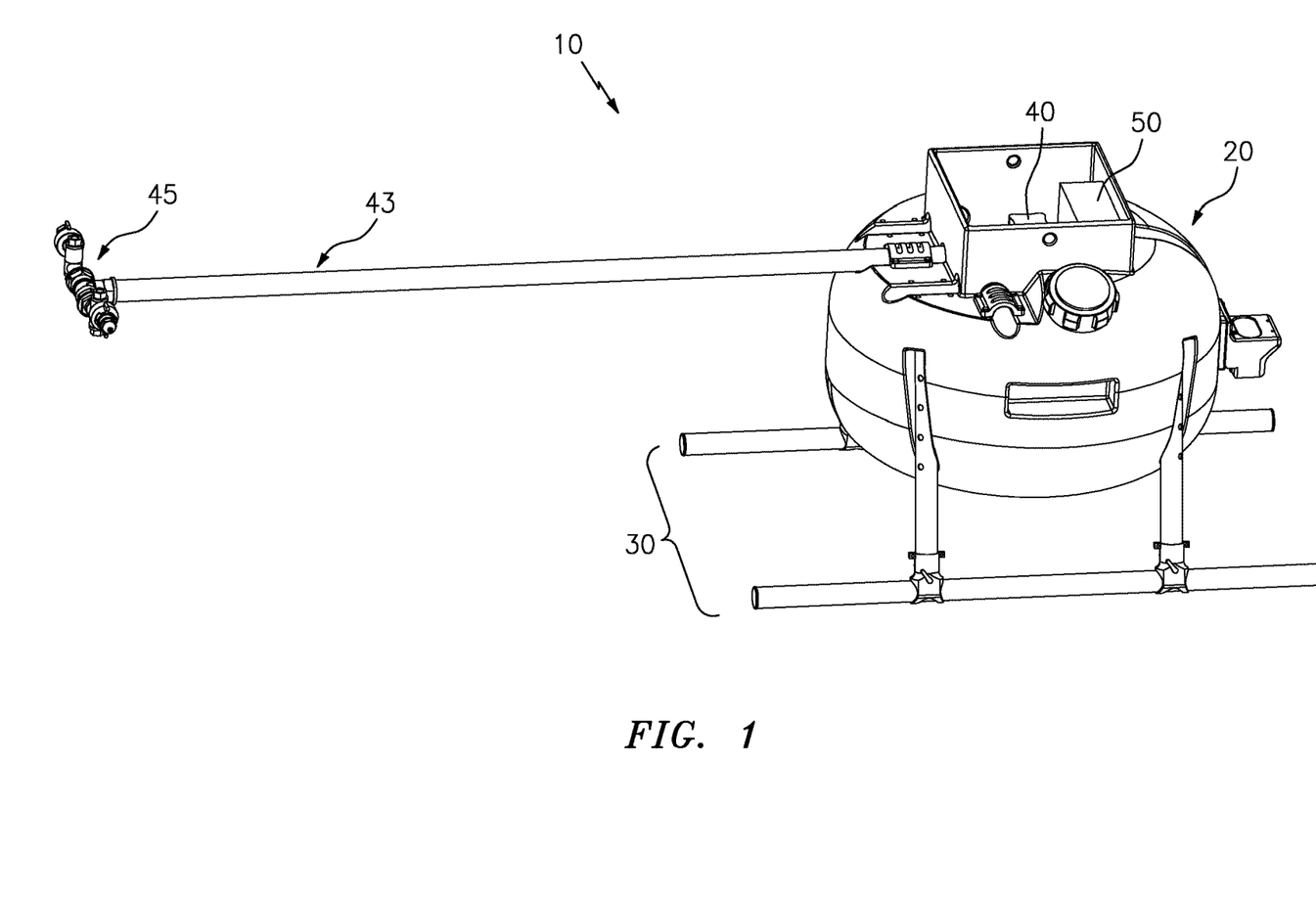
FIG. 1 is a perspective view of the UAV modular spraying system that is useful for understanding the inventive concepts disclosed herein.

As shown in FIG. 1, the modular sprayer system 10 can include, essentially, a liquid storage tank 20, having integrated landing gear, 30, an electric pump 40 a boom mounted dispenser unit 45, and a control unit 50.

Figure 2:
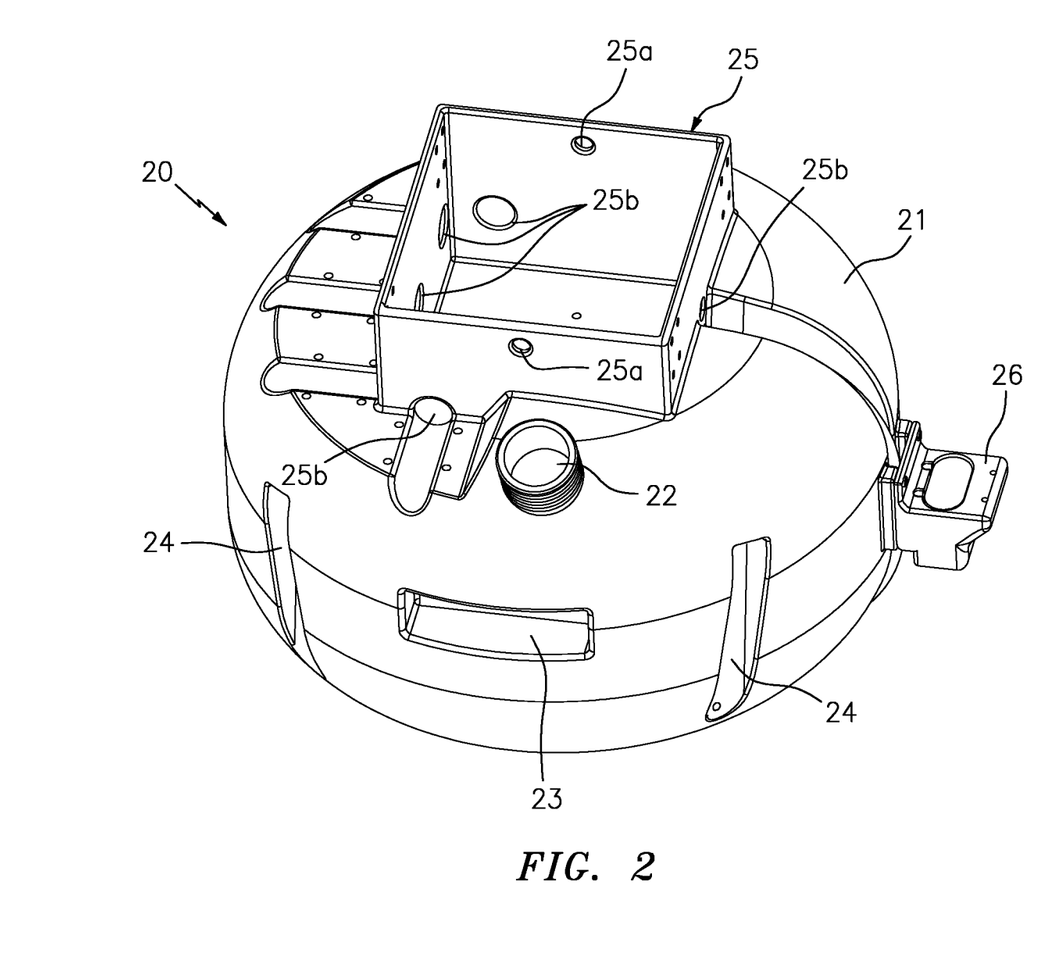
FIG. 2 is a perspective view of the liquid storage tank of the UAV modular spraying system, in accordance with one embodiment of the invention.

FIG. 2 illustrates one embodiment of the liquid storage tank 20. As shown, the tank can include a hollow watertight main body 21 for receiving and storing any type of liquid agricultural product via a capped opening 22. In various embodiments, the tank can include additional features such as optional carrying handles 23 and/or vertical channels 24 for accommodating the below described landing gear.

In the preferred embodiment, the storage tank can include, comprise or consist of a 7.5 gallon ellipse-shaped tank that is constructed from translucent plastic; however, other embodiments are contemplated wherein the storage tank includes any number of different shapes, sizes and construction materials to accommodate UAV's having different lifting capacities.

In one embodiment, a generally square-shaped UAV mounting unit 25 can extend upward from the top end of the tank body 21. The unit can include a plurality of hardware apertures 25a that are spaced at locations suitable for receiving hardware such as quick connect fittings, for example, to secure the system 10 onto the frame of a UAV. Likewise, the unit can include a plurality of boom apertures 25b for receiving one or more dispensing booms 43.

In addition to the above, one or more avionics shelves 26 may be positioned along the outside of the tank body 21 and/or the mounting bracket 25, at locations suitable for receiving imaging equipment such as camera and/or downward looking LIDAR sensor, for example.

Figure 3:
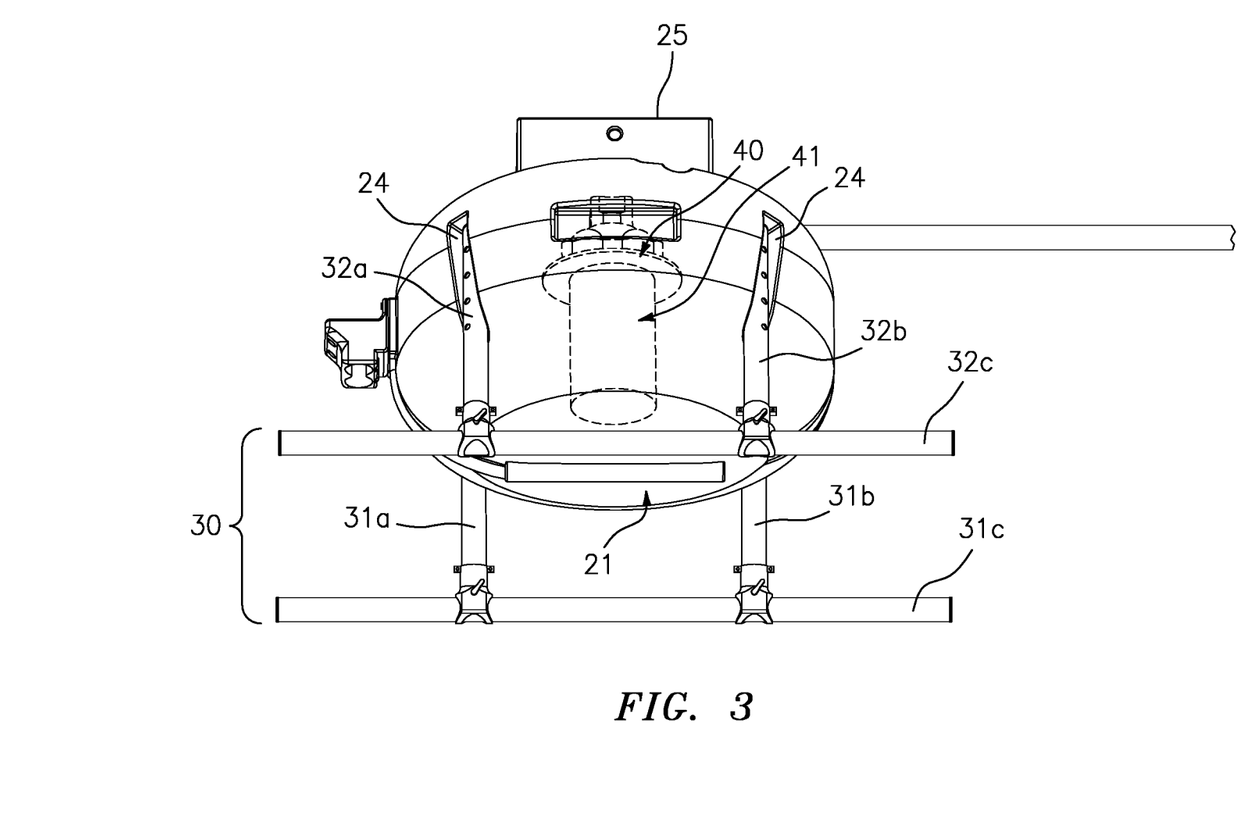
FIG. 3 is a bottom side perspective view of the UAV modular spraying system, in accordance with one embodiment of the invention.
Figure 4:
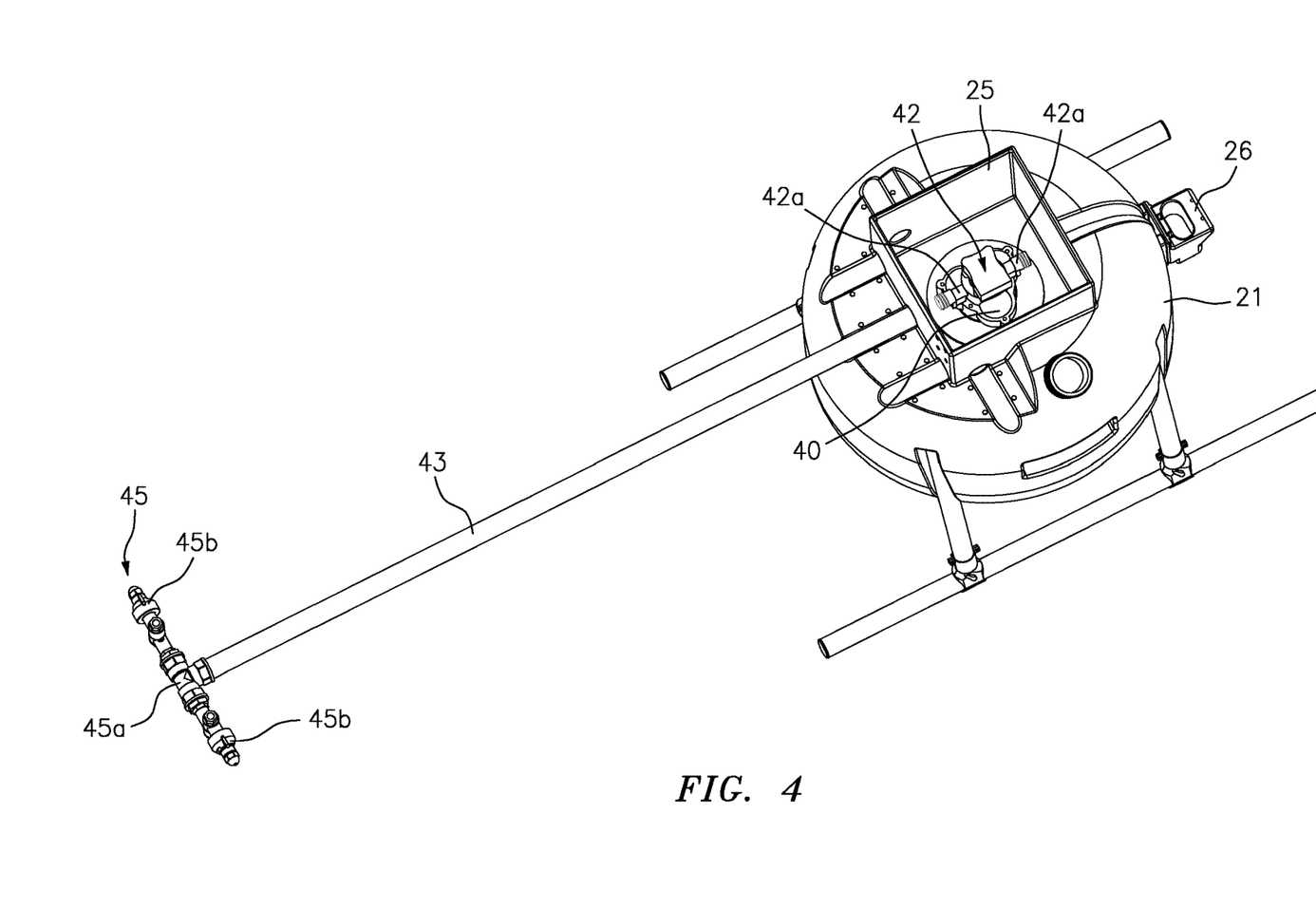
FIG. 4 is a top side perspective view of the UAV modular spraying system, in accordance with one embodiment of the invention.

As shown in FIGS. 3 and 4, the integrated landing gear 30 can preferably comprise a pair of landing skids for use by the UAV to which the system 10 will be secured. To this end, the gear can include two pairs of vertical shafts 31a, 31b and 32a, 32b, that are each connected to an elongated horizontal skid 31c and 32c, respectively, along the bottom ends. As shown, the top ends of the vertical shafts can be positioned within the vertical slits 24 of the tank, and mounted thereto by hardware such as bolts, for example.

In this regard, the slits 24 can be arranged so as to position the shafts 31a, 31b and 32a, 32b in a vertical orientation, regardless of the shape of the tank. Such a feature ensures the skids can be positioned beneath the tank body 21 evenly, so as to not affect the center of gravity of the UAV 1 to which the system 10 is mounted (See FIG. 6). Such a feature ensures an even trim for level flight and landings.

In various embodiments, the system 10 can include an electric pump 40 that is positioned so as to remove liquid contents from the tank 21 and discharge the same via a plurality of outlet nozzles. In one embodiment, the electric pump can include a motor 41 that is located inside the interior portion of the tank 21, and a valve assembly that is 42 located outside the tank within the hollow area of the mounting unit 25.

By positioning the pump motor 41 inside the tank body 21, the pump advantageously acts as a baffle to help reduce sloshing of the liquid contents of the tank during flight. Additionally, this location places the relatively heavy motor unit (typically 5 pounds) directly at, or in-line with the center of gravity of the UAV 1 to which the system is mounted, thereby ensuring an even trim during flight. One suitable example of a motor for use with the system includes the 12V DC electric motor model 2088-403-144, that is commercially available by Sureflo®; however any number of other such motors are also contemplated.

As shown, the valve unit 42 can include a plurality of outlets 42a, for dispensing the tank contents. The valve unit can be controlled by the below described control unit 50 so as to allow a system operator to selectively activate each of the plurality of outlets individually.

Each of the outlets can be connected to an elongated transfer boom 43, that is constructed from a hollow tubular member. Each of the booms can terminate into a fluid dispenser unit 45 having a hollow T-connector 45a, and a plurality of discharge nozzles 45b. In the preferred embodiment, the elongated boom(s) can include a length of approximately 3 feet. This distance being ideal for allowing the liquid to be dispensed without interference from the UAV's rotors; however, other lengths are also contemplated. Although illustrated with a single boom and dispenser in FIG. 4, the system 10 can accommodate multiple booms and dispensers (See FIG. 6).

In various embodiments, the system 10 can include a control unit 50, for allowing a remotely located operator to utilize the system to dispense fluids. The control unit can interface with the onboard flight avionics of the UAV to which the system will be attached, or may operate independently so as to communicate directly with the remote operator via separate wireless signal.

Figure 5:
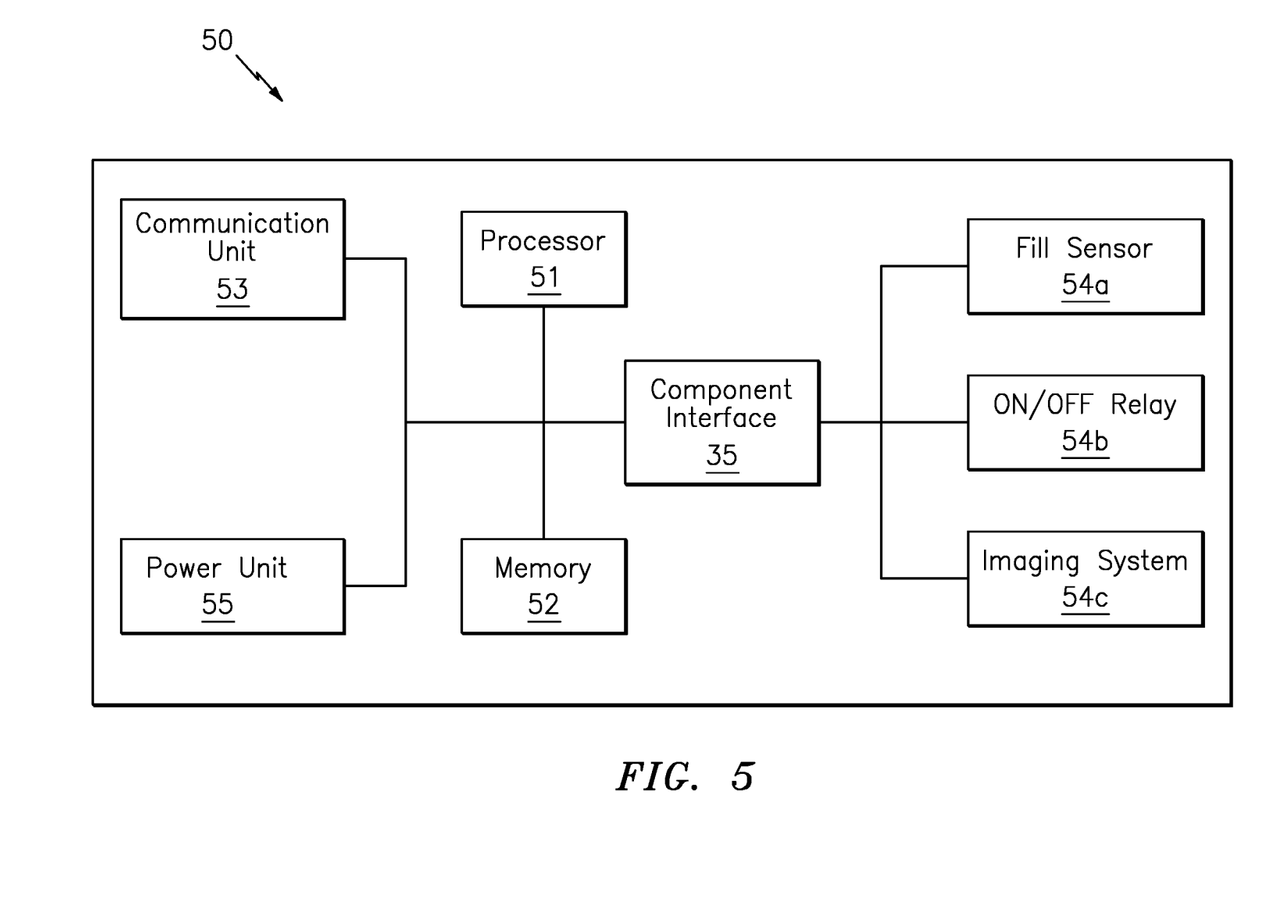
FIG. 5 is an exemplary block diagram of the system controller of the UAV modular spraying system, in accordance with one embodiment of the invention.

In either instance, FIG. 5 illustrates one suitable flight control unit 50 that includes a processor 51 that is conventionally connected to an internal memory 52, a communication unit 53, a component interface unit 54, and/or a power unit 55.

In the preferred embodiment, the control unit 50 can be positioned within the interior space of the mounting unit 25, so as to be protected from wind, water and dirt, however other locations, including placement on the UAV 1 itself, are also contemplated. Although illustrated as separate elements, those of skill in the art will recognize that one or more system components may comprise, or include one or more printed circuit boards (PCB) containing any number of integrated circuit or circuits for completing the activities described herein. The CPU may be one or more integrated circuits having firmware for causing the circuitry to complete the activities described herein. Of course, any number of other analog and/or digital components capable of performing the below described functionality can be provided in place of, or in conjunction with the below described controller elements.

The processing unit 51 can be a conventional central processing unit (CPU) or any other type of device, or multiple devices, capable of manipulating or processing information such as program code stored in the memory 52 in order to allow the device to perform the functionality described herein.

The memory 52 can act to store operating instructions in the form of program code for the processor 51 to execute. Although illustrated in FIG. 5 as a single component, memory 52 can include one or more physical memory devices such as, for example, local memory and/or one or more bulk storage devices. As used herein, local memory can refer to random access memory or other non-persistent memory device(s) generally used during actual execution of program code, whereas a bulk storage device can be implemented as a persistent data storage device such as a hard drive, for example, containing programs that permit the processor to perform the functionality described below. Additionally, memory 52 can also include one or more cache memories that provide temporary storage of at least some program code in order to reduce the number of times program code must be retrieved from the bulk storage device during execution. Each of these devices are well known in the art.

The communication unit 53 can include any number of components capable of sending and/or receiving electronic signals with another device in either a wired or wireless manner. In one embodiment, the communication unit can include a communications port or cable which can be physically coupled to the flight computer of the UAV to which the device will be attached. Such a feature can allow the pilot of the UAV to control the operation of each element of the system 10 through the flight computer/control interface of the UAV itself, utilizing one or more remote control devices, as are known in the art.

In one embodiment, the communication unit 53 can also include functionality for communicating directly with an external device, independently of the UAV's flight avionics. One such example can include a variable radio wave transceiver having a unique radio frequency chip capable of transmitting, receiving and translating a plurality of independent radio frequencies which can be sent from a remote control device and delivered to the processor 51 and/or the memory 52. Of course, any other known means for sending and receiving wireless signals are also contemplated for use herein.

The component interface unit 54 can function to provide a communicative link between the processor 51 and various other device components such as a tank fluid level sensor 54*a*, a pump actuator/relay 54*b*, and an imaging system 54*c*, such as a camera or LIDAR sensor, for example. In this regard, the component interface unit can include any number of different components such as one or more PIC microcontrollers, internal bus, USB connections and other such hardware capable of providing a direct link between the various components. Of course any other means for providing the two way communication between the identified components can also be utilized herein.

The power unit 55 can include any number of different components capable of providing and/or connecting the necessary power requirements to each element of the system. In the preferred embodiment, the power unit can comprise a power cable 55*a* having a connector for mating with the onboard electronics/batteries of the UAV to which the system will be mated. Such a feature allowing the system 10 to operate from the UAV power during operation. Of course, other embodiments are contemplated wherein the power unit includes or comprises one or more batteries which may be positioned along the tank body 21 to independently provide power to the system components.

FIG. 6 illustrates one embodiment of the modular sprayer system for heavy-lift unmanned aerial vehicles 10 in operation. As noted above, the system can utilize any number of booms and dispensers. Therefore, in the present illustration, two booms 43 and 43', each having dispenser units 45 and 45' are provided. One example of a suitable UAV 1 for use with the system 10 includes the HX8 vertical takeoff and landing drone that is commercially available from Harris Aerial, LLC., which is capable of lifting payloads over 75 lbs. Of course, the system 10 is not limited to use by any particular brand or model drone.

As shown, once the tank body 21 is filled with a desirable fluid, the mounting unit 25 can be aligned with the payload brackets on the bottom end of the drone 1 and secured thereto by connectors such as nuts/bolts or quick connect fittings, for example. When so positioned, the drone and system assembly will be supported by the integrated landing gear 30. Next, the communications/power cable(s) 55*a* can be connected to the electronics of the UAV, so as to allow the system 10 to receive power and/or operating instructions therefrom.

In operation, a remote user can fly the UAV to a desired location using the imaging sensor 54*c*. Upon reaching this location, the remote user can activate the pump 40 which can discharge the fluid via the dispenser unit(s) 45 and 45'. Moreover, the user can be informed of the fluid level within the tank via the sensor 54*a*.

As described herein, one or more elements of the sprayer system 10 can be secured together utilizing any number of known attachment means such as, for example, screws, glue, compression fittings and welds, among others. Moreover, although the above embodiments have been described as including separate individual elements, the inventive concepts disclosed herein are not so limiting. To this end, one of skill in the art will recognize that one or more individually identified elements may be formed together as one or more continuous elements, either through manufacturing processes, such as welding, casting, or molding, or through the use of a singular piece of material milled or machined with the aforementioned components forming identifiable sections thereof.

As to a further description of the manner and use of the present invention, the same should be apparent from the above description. Accordingly, no further discussion relating to the manner of usage and operation will be provided.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Likewise, the terms "consisting" shall be used to describe only those components identified. In each instance where a device comprises certain elements, it will inherently consist of each of those identified elements as well.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A modular sprayer system for use with heavy-lift unmanned aerial vehicles, said system comprising:
   a liquid storage tank having a top end, a bottom end, and a hollow interior space;
   a mounting unit that extends upward from the top end of the liquid storage tank, said mounting unit including a plurality of apertures that are configured to engage mounting brackets on the unmanned aerial vehicle;
   a pump that is in communication with the interior space of the liquid storage tank;
   at least one elongated boom that is in fluid communication with the pump;
   at least one dispenser unit that is in fluid communication with the elongated boom; and
   a control unit that is configured to control an operation of the pump.

2. The system of claim 1, further comprising:
   landing gear that is permanently secured to the liquid storage tank.

3. The system of claim 2, wherein the landing gear comprises a first pair of vertical shafts that are connected to a first horizontal skid; and
   a second pair of vertical shafts that are connected to a second horizontal skid.

4. The system of claim 1, wherein the pump comprises:
   an electric motor unit that is positioned within the hollow interior space of the liquid storage tank; and
   a valve unit that is positioned along the top end of the tank at a location adjacent to the mounting unit.

5. The system of claim 4, wherein the valve unit includes a plurality of outlets for removably engaging a plurality of different elongated booms.

6. The system of claim 1, wherein the control unit comprises:
   a communication unit for communicating with another device;
   a memory for storing operating instructions; and
   a processor that is in communication with each of the communication unit, the memory, and the pump.

7. The system of claim 6, wherein the communication unit is configured to communicate with a flight computer of an unmanned aerial vehicle to which the system is secured.

8. The system of claim 7, further comprising:
   an electrical relay for controlling an operation of the pump, and
   wherein an operation of the relay is controlled by the processor based on a communication from the flight computer of the unmanned aerial vehicle to which the system is secured.

9. The system of claim 7, further comprising:
   a fluid level sensor that is in communication with the processor, said sensor being configured to determine a fluid level inside the liquid storage tank, and
   wherein the determined fluid level is communicated to a device user via the flight computer of the unmanned aerial vehicle to which the system is secured.

10. The system of claim 7, further comprising:
    an imaging system that is in communication with the processor, said imaging system being configured to capture at least one of visual images and LIDAR information, and
    wherein the captured visual images or LIDAR information is communicated to a device user via the flight computer of the unmanned aerial vehicle to which the system is secured.

11. The system of claim 6, further comprising:
    a power unit having a power cable for receiving power from a battery of an unmanned aerial vehicle to which the system is secured.

* * * * *